(12) United States Patent  
Shirley (10) Patent No.: US 6,937,350 B2  
(45) Date of Patent: Aug. 30, 2005

(54) APPARATUS AND METHODS FOR OPTICALLY MONITORING THICKNESS

(75) Inventor: Lyle Shirley, Boxboro, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 383 days.

(21) Appl. No.: 10/180,679

(22) Filed: Jun. 26, 2002

(65) Prior Publication Data

US 2003/0011789 A1 Jan. 16, 2003

Related U.S. Application Data

(60) Provisional application No. 60/302,508, filed on Jun. 29, 2001.

(51) Int. Cl.$^7$ .............................. G01B 9/02; G01B 11/28
(52) U.S. Cl. ....................................... 356/630; 356/485
(58) Field of Search .............................. 356/601, 630, 356/485, 496, 502, 511

(56) References Cited

U.S. PATENT DOCUMENTS

| | | |
|---|---|---|
| 3,720,471 A | 4/1973 | Kasahara et al. |
| 3,749,500 A | 7/1973 | Carlson et al. |
| 3,828,248 A | 8/1974 | Wennerberg |
| 3,994,589 A | 11/1976 | Nodwell et al. |
| 4,068,955 A | 1/1978 | Bodlaj |
| 4,260,649 A | 4/1981 | Dension et al. |
| 4,311,392 A | 1/1982 | Yazaki et al. |
| 4,340,617 A | 7/1982 | Deutsch et al. |
| 4,359,485 A | 11/1982 | Donnelly et al. |
| 4,541,723 A | 9/1985 | Pirlet |
| 4,542,297 A | 9/1985 | Hold |
| 4,622,095 A | 11/1986 | Grobman et al. |
| 4,641,972 A | 2/1987 | Halioua et al. |
| 4,722,605 A | 2/1988 | Livnat et al. |
| 4,751,779 A | 6/1988 | Nagatomo et al. |
| 4,752,668 A | 6/1988 | Rosenfield et al. |
| 4,794,550 A * | 12/1988 | Greivenkamp, Jr. ........ 356/605 |

(Continued)

FOREIGN PATENT DOCUMENTS

| | | |
|---|---|---|
| DE | 28 50 092 A1 | 5/1980 |
| DE | 44 04 663 A1 | 8/1995 |
| DE | 4415834 C2 | 11/1995 |
| DE | 4415834 A1 | 11/1995 |
| DE | 19543347 A1 | 5/1997 |
| EP | 0 864 847 A2 | 9/1998 |
| EP | 0 864 847 A3 | 9/1998 |
| FR | 2 595 815 | 9/1997 |
| JP | 06117824 | 4/1994 |
| WO | WO 97/29341 | 8/1997 |

OTHER PUBLICATIONS

PCT International Search Report for International Application No.: PCT/US02/20516 (2002).

*Primary Examiner*—Zandra V. Smith (57) ABSTRACT

In one aspect, the invention relates to an apparatus for monitoring thickness variations of an object having first and second opposing surfaces. The apparatus includes a first source positioned to project a first fringe pattern at a first location on the first surface and a second source positioned to project a second fringe pattern at a first location on the second surface. The apparatus further includes a first detector positioned to detect the first fringe pattern at the first location on the first surface, the first detector generating a first signal in response to the first fringe pattern at the first location. The apparatus also includes a second detector positioned to detect the second fringe pattern at the first location on the second surface, the second detector generating a second signal in response to the second fringe pattern at the first location. The apparatus further includes a processor adapted to calculate variations in the thickness of the object in response to the first and the second signals.

22 Claims, 5 Drawing Sheets

U.S. PATENT DOCUMENTS

| | | | |
|---|---|---|---|
| 4,900,940 | A | 2/1990 | Nakamura |
| 4,948,460 | A | 8/1990 | Sandaiji et al. |
| 5,001,356 | A | 3/1991 | Ichikawa |
| 5,003,187 | A | 3/1991 | Zumbrunn et al. |
| 5,146,293 | A | 9/1992 | Mercer et al. |
| 5,310,624 | A | 5/1994 | Ehrlich |
| 5,351,126 | A | 9/1994 | Takada et al. |
| 5,389,196 | A | 2/1995 | Bloomstein et al. |
| 5,414,513 | A * | 5/1995 | Leib ............... 356/450 |
| 5,442,573 | A | 8/1995 | Bredberg et al. |
| 5,473,432 | A | 12/1995 | Sorin |
| 5,496,407 | A | 3/1996 | McAleavey |
| 5,502,564 | A * | 3/1996 | Ledger ............ 356/503 |
| 5,617,645 | A | 4/1997 | Wick et al. |
| 5,621,529 | A | 4/1997 | Gordon et al. |
| 5,659,392 | A | 8/1997 | Marcus et al. |
| 5,666,197 | A | 9/1997 | Guerra |
| 5,666,394 | A | 9/1997 | Swanson |
| 5,696,589 | A | 12/1997 | Bernacki |
| 5,761,066 | A | 6/1998 | Lettau et al. |
| 5,805,291 | A | 9/1998 | Calvin et al. |
| 5,811,826 | A | 9/1998 | Shirley |
| 5,870,191 | A | 2/1999 | Shirley et al. |
| 5,874,011 | A | 2/1999 | Ehrlich |
| 5,900,936 | A | 5/1999 | Shirley et al. |
| 5,995,226 | A * | 11/1999 | Abe et al. ............ 356/511 |
| 6,031,612 | A | 2/2000 | Shirley |
| 6,049,384 | A | 4/2000 | Rudd et al. |
| 6,100,977 | A * | 8/2000 | Muller ............... 356/496 |
| 6,229,619 | B1 | 5/2001 | Shirley |
| 6,341,015 | B2 | 1/2002 | Shirley |
| 6,438,272 | B1 | 8/2002 | Huang et al. |
| 2001/0012388 | A1 | 8/2001 | Muller et al. |

* cited by examiner

APPARATUS AND METHODS FOR OPTICALLY MONITORING THICKNESS

CROSS-REFERENCE TO RELATED APPLICATIONS

This application claims the benefits of provisional U.S. patent application Ser. No. 60/302,508 filed on Jun. 29, 2001 the disclosures of which are hereby incorporated herein by reference in their entirety.

GOVERNMENT SUPPORT

This invention was made with government support under Federal Contract No. F19628-95-L-002, awarded by the United States Air Force. The Government may have certain rights in the invention.

FIELD OF THE INVENTION

The invention relates to the field of surface measurement and, more specifically, to the field of non-contact thickness and flatness measurement.

BACKGROUND OF THE INVENTION

In many manufacturing processes, it is necessary to make thickness measurements. For example, thickness measurements are used to control the thickness of various manufactured sheet materials. In many cases it is desirable to monitor thickness and provide real-time feedback to the fabrication equipment. Thickness control is critical, for example, in the production of sheet-metal stock where variations in thickness adversely affect the quality and repeatability of stamped sheet metal components.

There are various methods available to monitor thickness. One such method includes the use of a caliper or other similar measuring device. Another includes the use of a profilometer. These methods involve contacting the surface of the object to be monitored with a probe or an instrument. However, these surface contact solutions are undesirable since they involve the invasive contacting of the surface and they generally require too much time to make a measurement.

Therefore, it is desirable to provide thickness monitoring using a non-contact methodology. Non-optical techniques include methods based on the penetration of x-rays and gamma rays (or other radiation), back-scatter measurements, the time delay between ultrasonic echoes from front and back surfaces, and magnetic effects. These techniques have disadvantages, however. For example, those based on absorption or scattering of x-rays and gamma rays, require like sources of radiation and detectors. Also, to minimize the level of radiation required and to contain the radiation for safety reasons, it is necessary to place the thickness monitor in close proximity to the object. Additionally, these measurements are affected by material properties, including density. These techniques are also impractical for very thick materials because of the high losses and the difficulty of achieving an adequate signal to noise ratio in the measurement. Techniques based on ultrasonic waves are affected by the speed of propagation within the material and require knowledge of the material properties. These ultrasonic techniques also require the device to be in close proximity to the object. A magnetic sensor technique is appropriate only to a limited number of materials such as paper.

Optical techniques exist which are based on triangulation, depth of focus, Moire fringes, and interferometry. The triangulation-based techniques have limited range resolutions. The depth of focus techniques require the use of a fixed reference plane or a fixed surface for supporting the object. Any deflection relative to the fixed reference surface is interpreted as a change in thickness or an indication of surface roughness or other surface conditions and provides an erroneous measurement of the surface profile or thickness of the object. Moire fringe techniques are generally only useful for semi-transparent objects such as liquids or glass which allow an optical beam to penetrate the top surface of the object. The technique is not suitable for materials such as sheet metal. Interferometric techniques generally require complex and expensive equipment and algorithms. Interferometers also constantly require calibration which is not practical in manufacturing environments. Additionally, interferometric techniques generally can only handle smoothly varying changes in thickness of the object and not abrupt thickness changes. Therefore, interferometric techniques cannot be used with a surface of poor optical quality.

What is needed is a technique which overcomes the range-resolution as well as the other difficulties outlined above while achieving sub-micron-level thickness measurements at relatively large standoff distances.

SUMMARY OF THE INVENTION

In one aspect, the invention relates to an apparatus for monitoring thickness variations of an object having first and second opposing surfaces. The apparatus includes a first source positioned to project a first fringe pattern at a first location on the first surface and a second source positioned to project a second fringe pattern at a first location on the second surface. The apparatus further includes a first detector positioned to detect the first fringe pattern at the first location on the first surface, the first detector generating a first signal in response to the first fringe pattern at the first location. The apparatus also includes a second detector positioned to detect the second fringe pattern at the first location on the second surface, the second detector generating a second signal in response to the second fringe pattern at the first location. The apparatus further includes a processor adapted to calculate variations in the thickness of the object in response to the first and the second signals.

The apparatus further includes a control system locating the first and second fringe patterns to second locations on the first and second surfaces, respectively, the first and second detectors generating third and fourth signals, respectively in response to the first and second fringe patterns at the second locations, the processor is adapted to calculate variations in the thickness of the object in response to the first, second, third and fourth signals. In one embodiment, the first and second sources are laser sources. In another embodiment, the first and second sources are the same source. In yet another embodiment, the first and second sources are generated from a single source. In still another embodiment, the first and second sources include two subsources. In another embodiment, the two subsources are coherent with respect to each other. In yet another embodiment, the first and second sources are broadband sources. In another embodiment, the first and second sources are coherent with respect to each other. In one embodiment, the first and second fringe patterns are generated by interfering radiation from at least two sources. In another embodiment, the radiation is generated by narrowband sources. In still another embodiment, the radiation is generated by broadband sources.

In one embodiment, the processor calculates the variations in the thickness by counting at least one fringe from the first fringe pattern and the second fringe pattern. In another embodiment, the processor calculates the variations in the thickness by detecting the displacement of at least one fringe in the first fringe pattern and the second fringe pattern. In yet another embodiment, the object is substantially stationary and the control system moves the first and second detector relative to the object. In still another embodiment, the first and second detector are substantially stationary and the control system moves the object relative to the first and second detectors. In yet another embodiment, the first and second detectors are chosen from the group including a photodetector, a charge coupled device (CCD), a camera, an array detector, a quadrant detector, and photosensitive film. In another embodiment, the first and second detectors are the same detectors. In yet another embodiment, a single detector replaces the first and second detectors.

In another aspect, the invention relates to an apparatus for calculating thickness of an object having first and second opposing surfaces. The apparatus includes a calibrated thickness standard having first and second opposing surfaces. The apparatus further includes a first source positioned to project a first fringe pattern at a first location on the first surface of the calibrated thickness standard, and a second source positioned to project a second fringe pattern at a first location on the second surface of the calibrated thickness standard. The apparatus further includes a first detector positioned to detect the first fringe pattern at the first location on the first surface of the calibrated thickness standard and a second detector positioned to detect the second fringe pattern at the first location on the second surface of the calibrated thickness standard. The first source is positioned to project a first fringe pattern at a first location on the first surface of the object, and the second source is positioned to project a second fringe pattern at a first location on the second surface of the object, and the first detector is positioned to detect the first fringe pattern at the first location on the first surface of the object. The second detector is positioned to detect the second fringe pattern at the first location on the second surface of the object. The apparatus further includes a processor for calculating the thickness of the object in response to a comparison between the detected first and second fringe patterns from the calibrated thickness standard and the detected first and second fringe patterns from the object.

In another aspect, the invention relates to an apparatus for monitoring the flatness of an object having a surface. The apparatus includes a source positioned to project a fringe pattern at the first location on the surface, and a detector positioned to detect the fringe pattern at the first location on the surface. The detector generates a first signal in response to the fringe pattern at the first location. The apparatus further includes a processor adapted to monitor variations in the flatness of the object in response to the first signal. In another embodiment, the apparatus includes a control system for locating the fringe pattern to a second location on the surface. The detector generates a second signal in response to the fringe pattern at the second location and the processor is adapted to monitor variations in the flatness of the object in response to the first and second signals.

The invention also relates to a method for monitoring thickness variations of an object having first and second opposing surfaces. The method includes illuminating the first surface with radiation from a first source to produce a first fringe pattern at a first location on the first surface and illuminating the second surface with radiation from a second source to produce a second fringe pattern at a first location on the second surface. The method further includes the step of detecting the first and second fringe patterns at the first locations on the first and second surfaces, respectively. The method also includes the step of monitoring variations in the thickness of the object in response to the detected first and second fringe patterns at the first locations on the first and second surfaces. In another embodiment, the method further includes the steps of moving the first and second fringe patterns to second locations on the first and second surfaces, respectively, detecting the first and second fringe patterns at the second locations on the first and second surfaces, respectively, and monitoring variations in the thickness of the object in response to a comparison between the first and second fringe patterns at the first locations, and the first and second fringe patterns at the second locations.

In another embodiment, the step of monitoring the variations in the thickness includes counting a fringe from the first fringe pattern and the second fringe pattern at the first and second locations. In yet another embodiment, the step of monitoring the variations in the thickness includes detecting the displacement of a fringe in the first fringe pattern and the second fringe pattern at the first and the second locations. In another embodiment, the step of moving the first and second fringe patterns includes holding the object substantially stationary and moving the first detector and the second detector relative to the object. In yet another embodiment, the the step of moving the first and second fringe patterns includes holding the first and second detectors substantially stationary and moving the object relative to the first and second detectors.

In one embodiment, the step of monitoring the variations in the thickness includes subtracting the first and second fringe patterns at the first locations from the first and second fringe patterns at the second locations. In another embodiment, the step of monitoring the variations in the thickness includes counting fringes from the first and second fringe patterns at the first locations. In yet another embodiment, the step of monitoring the variations in the thickness includes detecting the displacement of the fringes from the first and second fringe patterns at the first locations. In still another embodiment, the step of monitoring the variations in the thickness includes estimating fringe numbers in the first and second fringe patterns at the first locations.

The invention further relates to a method for calculating thickness of an object having first and second opposing surfaces. The method includes illuminating a first surface of a calibrated thickness standard with radiation from a first source to produce a first fringe pattern at a first location on the first surface of the calibrated thickness standard, illuminating a second surface of the calibrated thickness standard with radiation from a second source to produce a second fringe pattern at a first location on the second surface of the calibrated thickness standard. The method further includes detecting the first and second fringe patterns at the first locations on the first and second surfaces of the calibrated thickness standard, respectively. The method also includes illuminating the first surface of the object with radiation from a first source to produce a first fringe pattern at a first location on the first surface of the object, and illuminating the second surface of the object with radiation from a second source to produce a second fringe pattern at a first location on the second surface of the object. The method further includes detecting the first and second fringe patterns at the first locations on the first and second surfaces of the object, respectively, and calculating the thickness of the object in response to the detected first and second fringe patterns at the first locations on the first and second surfaces.

In another embodiment, the method further includes the steps of moving the first and second fringe patterns to second locations on the first and second surfaces, respectively, detecting the first and second fringe patterns at the second locations on the first and second surfaces, respectively, and calculating the thickness of the object in response to a comparison between the first and second fringe patterns at the first locations, and the first and second fringe patterns at the second locations. In another embodiment, the step of calculating the variations in the thickness includes counting a fringe from the first fringe pattern and the second fringe pattern at the first and the second locations. In another embodiment, the step of calculating the variations in the thickness includes detecting a displacement of a fringe in the first fringe pattern and the second fringe pattern at the first and the second locations.

In another embodiment, the step of moving the first and second fringe patterns includes holding the object substantially stationary and moving the first detector and the second detector relative to the object. In another embodiment, the step of moving the first and second fringe patterns includes holding the first and second detectors substantially stationary and moving the object relative to the first and second detectors. In another embodiment, the step of calculating the variations in the thickness includes subtracting the first and second fringe patterns at the first locations from the first and second fringe patterns at the second locations. In yet another embodiment, the step of calculating the variations in the thickness includes counting fringes from the first and second fringe patterns at the first locations. In another embodiment, the step of calculating the variations in the thickness includes detecting a displacement of the fringes from the first and second fringe patterns at the first locations. In another embodiment, the step of calculating the variations in the thickness includes estimating fringe numbers in the first and second fringe patterns at the first locations.

In another aspect, the invention relates to a method for monitoring variations in the flatness of an object having a surface. The method includes illuminating the surface with radiation from a source to produce a fringe pattern at a first location on the surface of the object, detecting the fringe pattern at the first location on the surface of the object; and monitoring the variations in the flatness of the object in response to the detected fringe pattern at the first location on the surface. In one embodiment, the method further includes the steps of moving the fringe pattern to a second location on the surface, detecting the fringe pattern at the second location on the surface, and monitoring the variations in the flatness of the object in response to a comparison between the fringe pattern at the first location, and the fringe pattern at the second location. In another embodiment, the method further includes the steps of illuminating a surface of a known flat standard with radiation from the source to produce a fringe pattern at a first location on the surface of the known flat standard, detecting the fringe pattern at the first location on the surface of the known flat standard, and comparing the variations in the flatness of the known flat standard with the variations in the flatness of the object to generate compensated variations in the flatness of the object.

In one embodiment, the step of monitoring the flatness includes counting at least one fringe from the fringe pattern at the first location. In another embodiment, the step of monitoring the flatness includes detecting a displacement of a fringe in the fringe pattern at the first location. In yet another embodiment, the step of moving the fringe pattern includes holding the object substantially stationary and moving the detector relative to the object. In still another embodiment, the step of moving the fringe pattern includes holding the detector substantially stationary and moving the object relative to the detector. In one embodiment, the step of monitoring the flatness includes subtracting the fringe pattern at the first location from the fringe pattern at the second location. In another embodiment, the step of monitoring the flatness includes counting fringes from the fringe pattern at the first location. In yet another embodiment, the step of monitoring the flatness includes detecting a displacement of the fringes from the fringe pattern at the first location. In still another embodiment, the step of monitoring the includes estimating fringe numbers in the fringe pattern at the first location.

BRIEF DESCRIPTION OF THE DRAWINGS

The above and further advantages of this invention may be better understood by referring to the following description taken in conjunction with the accompanying drawings, in which.

DETAILED DESCRIPTION

While describing the embodiment of the invention, reference will be made to "sources" and "sources of radiation." These terms are meant to refer to any source of radiation, including highly localized sources of radiation.

Figure 1:
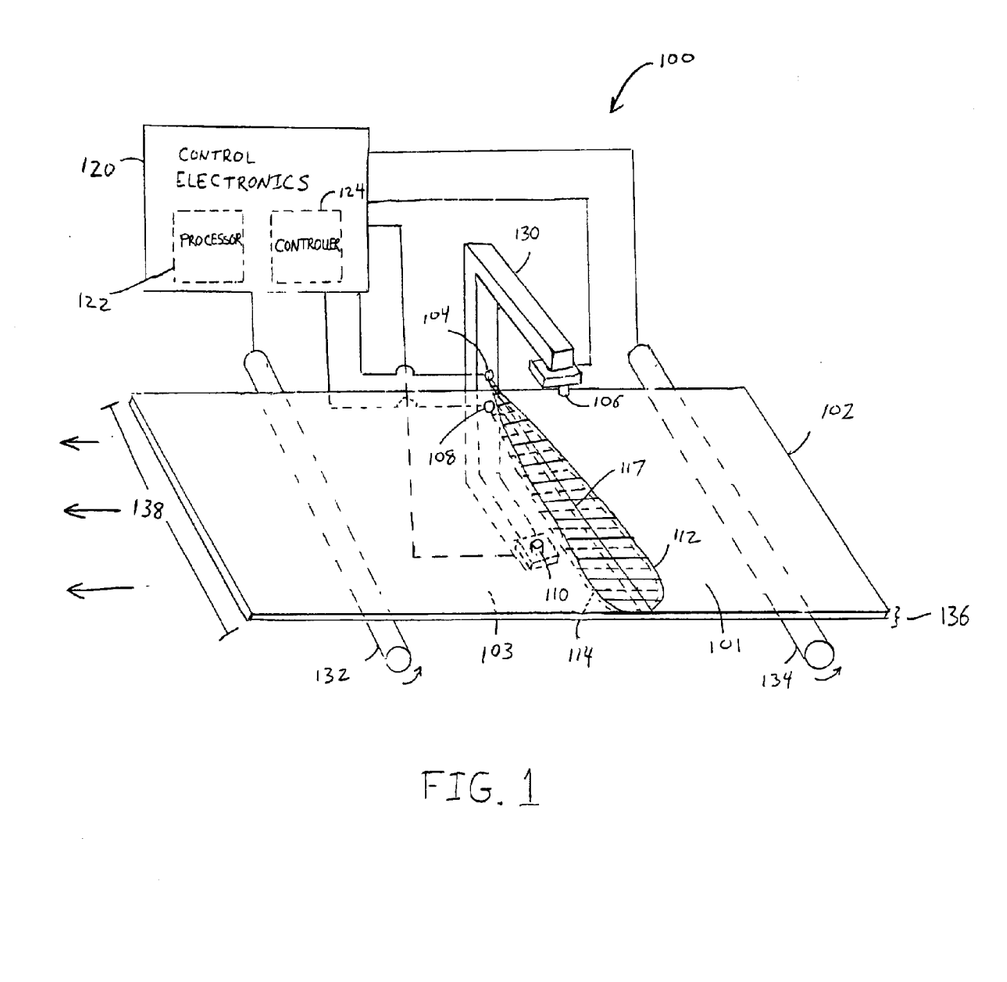
FIG. 1 is a block diagram of an illustrative embodiment of the invention for making thickness measurements.

A preferred embodiment of the invention is illustrated in FIG. 1. The system 100 is shown as monitoring the thickness of a sheet of material 102 passing through the system 100. In alternate embodiments, the material 102 is steel, plastic, rubber, lumber, paper, or the like. Generally the material 102 is produced by high speed extrusion, rolling, drawing, casting, sawing, or other similar techniques in which the output is carried along a conveyer-type apparatus. The system 100 comprises a first source of radiation 104 and a first detector 106. The system further comprises a second source of radiation 108 and a second detector 110. The first source 104 is adapted to project a first fringe pattern 112 onto a first surface 101 of the sheet of material 102. The second source 108 is adapted to project a second fringe pattern 114 onto a second opposing surface 103 of the sheet of material 102. The first detector 106 is adapted to detect the first fringe pattern 112 from the first surface 101. The second detector 110 is adapted to detect the second fringe pattern 114 from the second surface 103. In some embodiments, one detector can be used to detect both the first fringe pattern 112 and the second fringe pattern 114.

The first 104 and second 108 sources are also referred to as fringe sources, fringe generators, or fringe projectors. Each of the first 104 and second 108 sources produce an interference pattern. The interference pattern consists of regions of varying light intensity. It will be appreciated by skilled artisans that although the system 100 is described in terms of the generation of an interference pattern, any device which is capable of projecting a pattern of periodic light and dark regions of accurately known spacing (hereinafter referred to generally as a fringe pattern) may be used as the first 104 and second 108 source. Example embodiments of fringe sources are discussed in detail with reference to FIG. 4 and FIG. 5.

The system 100 further includes control electronics 120. In alternate embodiments, the control electronics 120 includes all the electronics required for system operation. In one embodiment, the control electronics 120 includes a processor 122. In another embodiment, the control electronics 120 includes a controller 124. In one embodiment, the controller 124 is used to control the motion of the sheet of material 102. The system 100 further comprises a structure 130 for supporting the various system components, such as the fringe projectors 104, 108 and detectors 108, 112. In another embodiment, a set of rollers 132 and 134 convey the sheet of material 102 through the system 100.

In operation the system 100 determines the thickness of the sheet of material 102 as follows. The first source 104 projects a first fringe pattern 112 on a first surface 101 of the sheet of material 102. A first detector 106 is positioned so as to detect the first fringe pattern 112. Similarly, the second source 108 projects a second fringe pattern 114 on a second surface 103 of the sheet of material 102. A second detector 110 is positioned so as to detect the second fringe pattern 114. In alternate embodiments, the detectors 106, 110 include a camera, array detector, charge coupled device (CCD), photodetector, photodiode, quadrant detector, photosensitive film, or the like. In various embodiments, the first detector 106 and the second detectors are positioned to monitor the projected fringe patterns 112, 114, respectively, at locations where the thickness is to be determined. In alternate embodiments, the first and second detectors 106, 110 provide wide-area coverage, narrow-strip coverage, or selected-point coverage. In another embodiment, multiple detectors are used to achieve the desired coverage.

In one embodiment, the first source 104 and the first detector 106 and the second source 108 and the second detector 110 are aligned so as to project and detect fringe patterns at corresponding locations on the first 101 and second 103 opposing surfaces of the sheet of material 102, respectively. In another embodiment, the fringes in the projected fringe patterns 112 and 114 are substantially parallel to the direction of motion of the sheet of material 102.

The first detector 106 generates a first signal based on the intensity of fringes at a location on the first surface 101 of the sheet 102. The second detector 108 generates a second signal based on the intensity of fringes at the same surface location but on the opposite surface 103 of the sheet 102. The first and second signals are transmitted to a processor 122. In one embodiment, the processor 122 is a computer. The computer analyzes the first and second detected signals to generate a result corresponding to the thickness 136 of the sheet of material 102. In another embodiment, the first 104 and second 108 detectors detect the first 112 and second 114 fringe patterns across the width 138 of the sheet of material 102. In yet another embodiment, the control electronics 120 moves the sheet of material 102 lengthwise a predetermined distance. The first 106 and second 108 detectors are adapted to continuously detect the first 112 and second 114 fringe patterns, respectively, as the sheet of material 102 moves through the system 100. The computer 122 is programmed to receive the first and second signals from the first 106 and second 110 detectors either continuously, at some predetermined time interval, or whenever thickness monitoring is required.

In another embodiment, the control electronics 102 is coupled to a feedback loop (not shown). The feedback loop is used to control the manufacturing process. As the thickness 136 of the sheet of material 102 varies, the first 112 and second 114 fringe patterns vary. The first 106 and second 110 detectors sense the change. The computer 122 analyzes the data from the detectors and determines whether the thickness 136 of the sheet of material 102 is within a preset tolerance. The computer couples to a feedback circuit. The feedback circuit couples to the sheet fabrication equipment (not shown). The feedback circuit provides thickness monitoring data to the sheet fabrication equipment. The sheet fabrication equipment uses the thickness monitoring data to control the sheet fabrication process.

In one embodiment, rollers 132 and 134 couple to the control electronics 102. The rollers 132 and 134 are adapted to rotate at a predetermined rate. In another embodiment, the rollers 132 and 134 are reversible. In yet another embodiment, the rollers 132 and 134 are controlled by the control electronics 120. The control electronics 120 control the speed and the direction of the rollers 132 and 134. In another embodiment, the control electronics 120 stop the rollers 132 and 134 at predetermined time intervals.

In one embodiment, the processor 122 generates a thickness map of the sheet of material 102. The processor 122 gathers thickness data from the first 106 and second 110 detectors at various locations across a width 138 of the sheet of material 102. Next, the control electronics 120 moves the sheet of material 102 a predetermined distance. Again, the processor 122 gathers thickness data from the first 106 and second 110 detectors at various locations across the width 138 of the sheet of material 102. By successively measuring the thickness and moving the sheet, the processor 122 generates a contour map corresponding to the thickness at various measured points on the sheet of material 102.

Figure 2A:
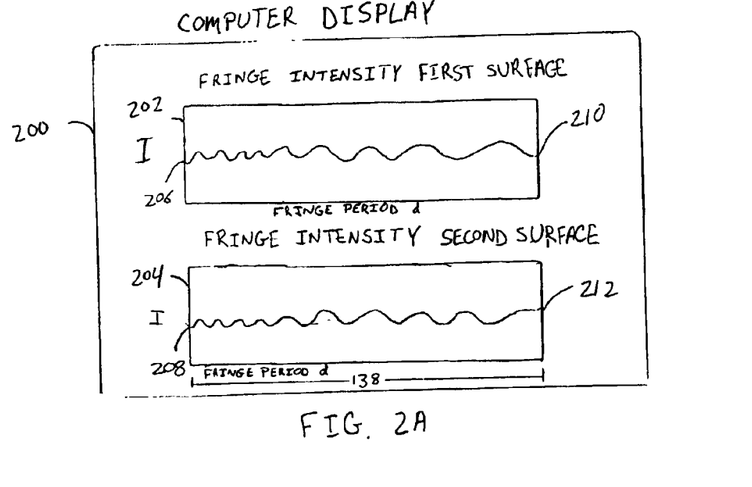
FIGS. 2A–2C illustrate typical fringe motion observed by a processor according to the embodiment of the invention shown in FIG. 1.

FIG. 2A illustrates a computer display 200 according to one embodiment of the invention. The computer display 200, in this embodiment, displays the detected intensity of the first 202 and second 204 fringe patterns as shown. In one embodiment, the first source 104 and the second source 108 are positioned to project the first fringe pattern 112 and the second fringe pattern 114, respectively, on the sheet of material 102. The first source 102 and the second source 108 are adapted to project the first fringe pattern 112 and the second fringe pattern 114, respectively, at a substantially grazing angle of incidence as shown in FIG. 1. The resultant fringes from the first fringe pattern 112 and the second fringe pattern 114 spread across the first surface 101 and the second surface 103, respectively, of the sheet 102 in a non-linear fashion. The fringes nearest to the first source 104 and the second source 108 are closely spaced, whereas the fringes furthest away from the first source 104 and the second source 108 are spaced further apart. FIG. 2A illustrates the intensity I versus fringe period d of the first fringe pattern 112 and second fringe pattern 114 as detected by the first detector 106 and the second detector 110, respectively. The periods d of the first fringe pattern 112 and the second fringe pattern vary across the width 138 of the sheet of material 102. For example, the period d at the fringe 206 is different than the period d at the fringe 210. In one embodiment, the periods d of the first fringe pattern 112 and the second fringe pattern 114 are well known. In another embodiment, the intensity I of the first fringe pattern 112 and the second fringe pattern 114 is substantially uniform across the width 138 of the sheet of material 102.

Figure 2B:
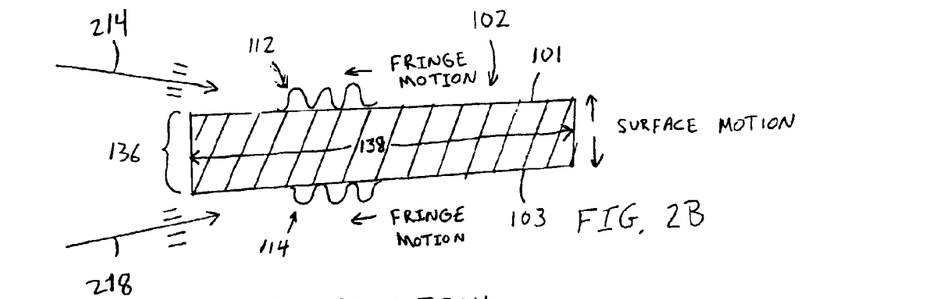

FIG. 2B illustrates the effect of increasing thickness 136 of a sheet of material 102 on the first 112 and the second 114 fringe patterns. As the sheet of material 102 becomes thicker, the first 106 and the second 110 detectors observe the first 112 and the second 114 fringe patterns moving toward the first 104 and second 108 sources, respectively. The first source 104 projects the beam 214 onto the first surface 101 of the sheet 102. The second source 108 projects the beam 218 onto the second surface 103 of the sheet 102.

Figure 2C:
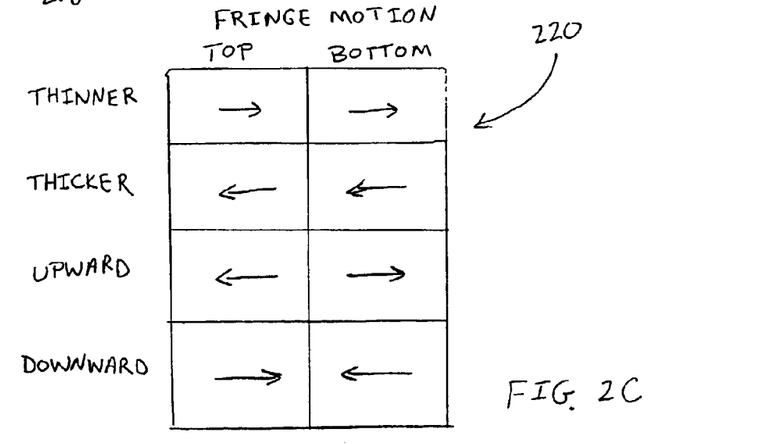

FIG. 2C depicts a table 220 describing the effect of thickness variations and vertical translations of the sheet on various translations of the first 112 and second 114 fringe patterns. The first source 104 and the second source 108 are oriented on the left side of FIG. 2B. In this embodiment, an upward motion of the first surface 101 of the sheet of material 102 causes the first fringe pattern 112 to shift to the left, towards the first source 104. A downward motion of the second surface 114 also causes the second fringe pattern 114 to shift to the left, towards the second source 108. The table in FIG. 2C indicates how various thickness variations and vertical translations affect the first 112 and the second 114 fringe patterns. For example, when the first detector 106 detects the rightward motion of the first fringe pattern 112, and the second detector detects the rightward motion of the second fringe pattern 114, that indicates a reduction in thickness of the sheet of material 102. If the first detector 106 and the second detector 108 detect motion in opposite directions, that indicates a vertical translation of the sheet of material 102. In one embodiment, the processor 122 determines the thickness 136 of the sheet of material 102 by combining the results from the detected first fringe pattern 112 and the detected second fringe pattern 114. In another embodiment, the processor 122 removes sheet translation errors from the thickness measurement by analyzing the detected first 112 and second 114 fringe patterns. The processor 122 determines the degree of motion from the first fringe pattern 112 and the second fringe pattern 114. By analyzing the direction and magnitude of the motion of the fringe patterns 112 and 114, the processor 122 compensates for vertical translation of the sheet 102. This vertical translation might otherwise be interpreted as a change in thickness 136 of the sheet 102. In one embodiment, the processor 122 combines the magnitudes of the translation of the first fringe pattern 112 and the second fringe pattern 114. This compensates for first order translation effects. In another embodiment, higher order translation effects are compensated using according fringe interferometry (AFI) techniques discussed in U.S. Pat. No. 5,870,191 and U.S. Pat. No. 6,031,612, the disclosures of which are hereby incorporated by reference. Skilled artisans will appreciate that other techniques which relate fringe number to vertical translation can be used to compensate for vertical translation of the sheet material 102.

Figure 3:
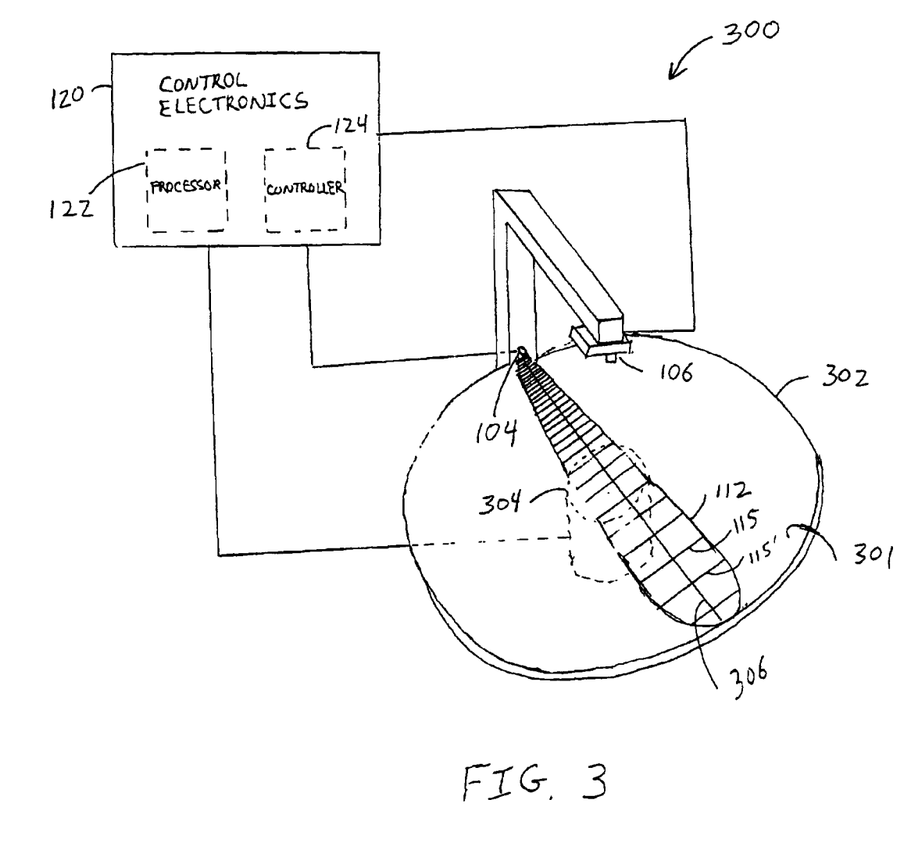
FIG. 3 is a block diagram of an illustrative embodiment of the invention for monitoring flatness.

FIG. 3 is a block diagram of an illustrative embodiment of an apparatus 300 for monitoring flatness. The flatness monitor 300 is used to measure the flatness of materials 302 such as silicon wafers, other semiconductor wafers, compact disks (CDs), sheet metal, glass, plastic, or any material requiring a measure of flatness. In another embodiment, the material is substantially circular.

In one embodiment, the flatness monitor 300 comprises a source 104 for projecting a fringe pattern 112. The flatness monitor 300 further includes a detector 106 positioned to detect the fringe pattern 112. The flatness monitor 300 further includes a rotatable chuck 304 adapted to secure the material 302. In alternative embodiments, vacuum (not shown), magnetics (not shown), clips, fasteners, or the like, are used to secure the material 302 to the chuck 304. In another embodiment, the chuck 304 couples to a mechanism (not shown) such as a stepper motor. The mechanism is used to rotate the chuck 304.

The flatness monitor 300 further includes control electronics 120. In one embodiment, control electronics 120 controls all aspects of the flatness monitor 300. In another embodiment, control electronics 102 includes a processor 122. In one embodiment, the processor 122 is any suitable computer. In another embodiment, the control electronics includes a controller 124. In one embodiment, the controller 124 is adapted to control the speed and direction of the rotatable chuck 304. In another embodiment, the controller 124 is adapted to control the source 104. In yet another embodiment, the controller 124 is adapted to control the detector 106. In other embodiments, the control electronics 120 includes all the electronics required for system operation.

Skilled artisans will appreciate that the source 104 and detector 106 include any devices suitable for projecting fringes onto the surface 301 of the material 302 and detecting those fringes as has been discussed previously.

The operation of the flatness monitor 300 will be discussed next. The material 302 to be monitored is placed onto chuck 304. In one embodiment, the material is a semiconductor wafer. The wafer is substantially circular. In another embodiment, a mechanism (not shown) is used to center the wafer on the chuck 304. The wafer is held tightly to the chuck 304, for example, by means of a vacuum (not shown). In one embodiment, the chuck is precisely machined to be flat and to hold the wafer flat. In another embodiment, the run-out in the chuck 304 or sloppiness in the bearing rotating the chuck 304 is compensated so as not to affect the flatness measurement. In another embodiment, a known flat standard is used to calibrate the run-out and flatness of the chuck 304.

The source 104 projects the fringe pattern 112 onto the surface 301 of the wafer. In one preferred embodiment, the fringe pattern 112 is projected along a diameter of the wafer as shown in FIG. 3. In this embodiment, each fringe 115, 115' is located substantially perpendicular to a diameter 306 of the wafer. Fringe pattern 112 should not be thought of as limited to only fringes 115, 115'. Typical fringe patterns 112 contain many fringes.

The detector 106 is positioned so as to detect the fringe pattern on the surface 301 of the wafer. In alternative embodiments, the detector 106 comprises a plurality of detectors. In another embodiment, the detector 106 is a camera. In a preferred embodiment, the camera is adapted to view a narrow strip of the fringe pattern 112 across the diameter 306 of the wafer. In yet another embodiment, the camera is adapted to view a strip of the fringe pattern across a radius of the wafer. Preferably, the fringes 115, 115' in the fringe pattern 112 are positioned so as to be tangent to the arc of rotation of the wafer. In other embodiments, the detector 106 detects various points on the surface 301.

In one embodiment, the detector 106 detects changes in the positions of the fringes 115, 115' in the fringe pattern 112 across the diameter 306 of the wafer. In another embodiment, the detector 106 detects changes in the positions of the fringes 115, 115' in the fringe pattern 112 as the chuck 304 rotates the material 302. In yet another embodiment, detector 106 couples to the control electronics 120. In still another embodiment, the control electronics 120 includes a processor 122. The processor 122 receives data from the detector 106 indicative of the translation of the fringe pattern 112 on the surface 301 of the material 302. The processor 122 analyzes the data to determine the flatness of the material 302.

As briefly discussed previously, in one embodiment, a known flat standard is placed on the chuck 304 to calibrate the flatness monitor 300. For example, the processor 112 uses the standard to calibrate inaccurate machining of the chuck 304. This inaccurate machining leads to false flatness measurements as the chuck 304 wobbles during rotation. The flatness monitor 300 measures the known flat standard. The processor 122 removes any observed fringe translations. In one embodiment, a stepper motor couples to the chuck 304. The processor 122 stores rotation information about the chuck 304. The processor 122 can then map the observed translation of the fringe pattern to the rotated position of the chuck 304.

Referring again to FIG. 1 the fringe patterns 112, 114 are generated in various ways. For example, conventional projectors that image fringe patterns onto the surface 101 can be used. However, conventional projectors have a limited depth of field. Consequently, it may be difficult to focus the pattern over the entire width 138 of the sheet of material 102.

Fringe patterns 112, 114 formed by interference or diffraction generally have an unlimited depth of field and do not suffer from this problem. Therefore, in a preferred embodiment, sources 104, 108 are two-point-source fringe generators described in detail in U.S. Pat. No. 6,031,612, the disclosure of which is hereby incorporated by reference. In other embodiments, the sources 104, 108 are laser based or white-light base. Skilled artisans will appreciate that white-light based sources have an advantage in that speckle noise is eliminated automatically.

Irrespective of the fringe-generation method, the thickness monitor 100 achieves high resolution by measuring fringe motion to very small fractions of a fringe width. The invention contemplates various methods to measure fringe motion. One embodiment of the invention relies on phase measurement. In that embodiment, the phase of the projected fringe pattern 112 is shifted by a known amount. By using mathematical formulas known to skilled artisans, the processor 122 calculates the spatial phase of the fringe pattern 112 from the corresponding intensity detected by the detector 106. For example, if $I_1$, $I_2$, and $I_3$ represent three intensity measurements at a given location on the surface while the fringe pattern is shifted by $-\alpha$, $0$, and $+\alpha$, respectively, then the spatial phase of the fringe pattern for the unshifted middle position is given by:

$$\phi = \tan^{-1}\left(\frac{I_1 - I_3}{2I_2 - I_1 - I_3}\tan\frac{\alpha}{2}\right) \quad (1)$$

By phase-shifting the fringe pattern 112, it is possible to determine the thickness at each pixel point on the detector 106, simultaneously. If the sheet of material 102 is moving, however, the three intensity measurements, $I_1$, $I_2$, and $I_3$, do not occur at exactly the same positions on the surface. In one embodiment, this problem is dealt with by using different appropriate lines of pixels in a two-dimensional imaging array such that the same location of the surface 101 is imaged at each of the phase shifts. In another embodiment, these corrections are not necessary for sheets of material 102 whose thickness and reflectivity vary slowly. In yet another embodiment, motion of the sheet of material 102 serves to statistically average out measurement variations.

In other embodiments, it is only necessary to measure the thickness at one or more sample points along an image strip 117 of FIG. 1. In one embodiment, a spatial implementation of phase shifting is used to reduce the imaging and processing speed requirements. In this embodiment, it is unnecessary to phase shift the projected fringe pattern 112. Instead, a set of measurement points (or pixels along the image strip) is selected for each point at which the thickness 136 is to be determined. The set of measurement points corresponding to each thickness measurement is chosen such that the fringe pattern 112 is sampled at known phase offsets. For example, in order to sample the intensity of the fringes at 90° offsets, points along the image strip 117 that are one-quarter cycle apart on the fringe pattern 112 are measured. If $I_1$, $I_2$, and $I_3$ represent three spatial measurements with equal phase offsets, then equation 1 still holds. More details regarding this approach can be found in U.S. Pat. No. 5,900,936, the disclosure of which is hereby incorporated by reference.

One contemplated effect of spatial-phase measurement is that the measurements corresponding to one thickness value are taken at different, albeit nearby, points on the surface 101. In one embodiment, the difference in the location of points on the surface 101 does not substantially affect the measurement as long as the reflectively of the surface 101 is relatively uniform, the thickness 136 of the sheet 102 varies slowly, and the angular orientation of the surface 101 does not vary radically in the direction along the image strip 117. These conditions are satisfied for a wide range of applications. Consequently, thickness 136 can be monitored at high rates of speed and for rapidly moving sheets of material 102. In other embodiments, the motion of the sheet 102 benefits the measurement by averaging out statistical variations.

Figure 4:
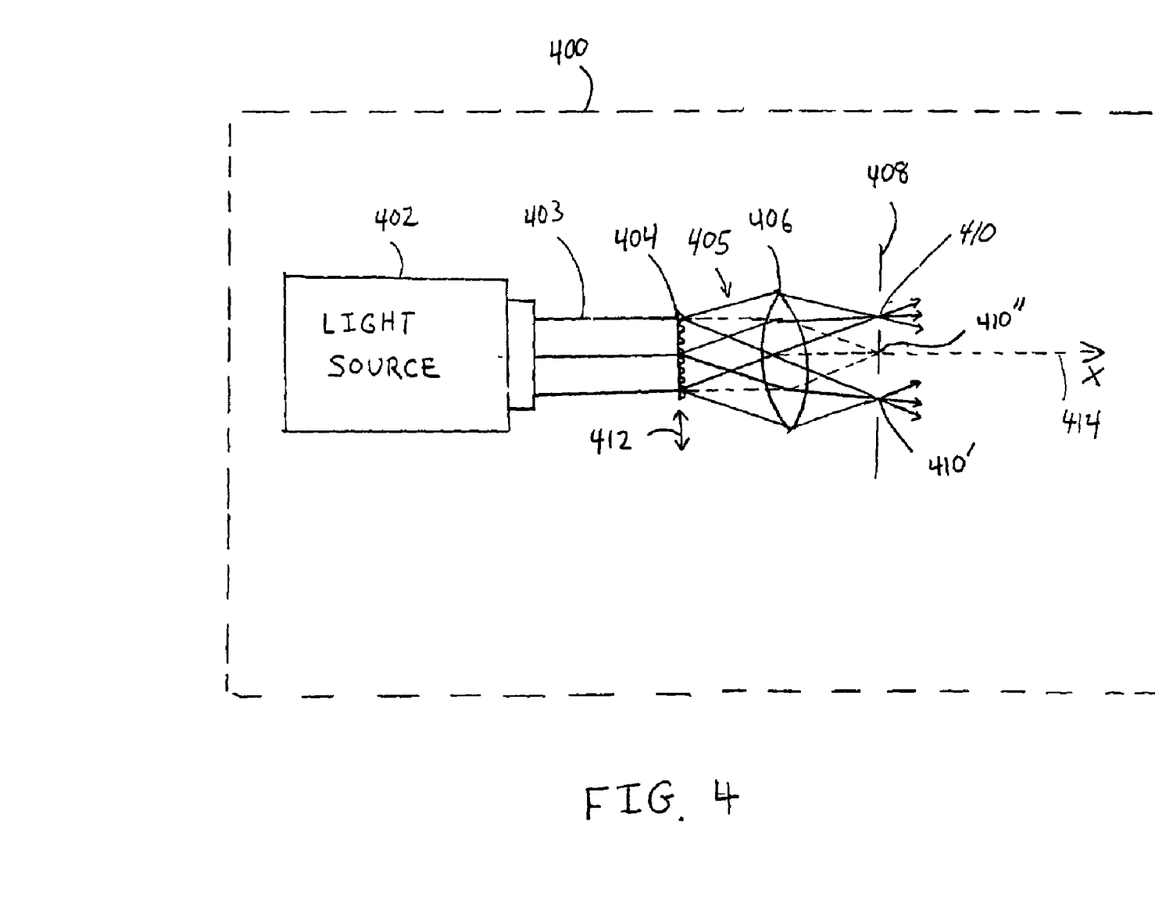
FIG. 4 is a block diagram of an apparatus for generating a fringe pattern according to one embodiment of the invention.

FIG. 4 depicts a preferred embodiment of a source head 400 for generating interference fringes. The source head 400 includes light source 402. In one embodiment, the light source 402 generates substantially collimated light 403. In another embodiment, the light source 402 generates coherent light. In other embodiments, the light source 400 is a narrowband source or a broadband source. The source head 400 also includes a diffraction grating 404. The source head 400 further includes a lens 406. In another embodiment, the source head 400 also includes a beam block 408. In one embodiment, the beam block 408 is a double slit.

In operation a substantially collimated beam of light 403 generated by the light source 402 impinges on the diffraction grating 404. The diffraction grating 404 divides the collimated beam 403 into multiple beams 405 having multiple diffraction orders. In one ideal embodiment, the diffraction grating 404 is designed to maximize the diffracted efficiency for the positive and negative first-order diffracted beams 405 (or another preferred set of positive and negative beams of the same order) and to minimize the energy diffracted into another orders. The diffracted beams 405 next impinge on a lens 406. The lens 406 forms focal spots 410, 410' and 410" at the location of the plane of the beam block 408. The focal spots 410, 410' and 410" correspond to three different diffracted orders. The beam block 408 blocks the focal spots corresponding to the zero-order beam 410" and any beams other than the positive and negative first-order beams 410, 410' (or another preferred set of positive and negative beams of the same order).

The two focal spots 410, 410' are also referred to as point sources. The point sources are coherent with respect to each other. Radiation from the two point sources 410, 410' expands as it propagates. This expansion leads to overlapping, which forms an interference-fringe pattern 112. The interference pattern 112 falls onto a surface 101 or surfaces to be monitored. Phase shifting of the fringe pattern 112 is achieved by simply translating the diffraction grating 404 in the direction shown by callout 412.

In one embodiment, by using the combination of the diffraction grating 404 and the lens 406, the spatial distribution of radiation in the interference pattern 112 is substantially insensitive to the wavelength of the source 402. This is due to the separation α between focal spots 410 and 410' corresponding to a monochromatic source of wavelength λ being proportional to wavelength λ to first order. The fringe period is largely independent of wavelength λ because the fringe period is proportional to λ/a and the wavelength λ dependence in the separation a between the focal spots 410 and 410' cancels the wavelength λ dependence in the numerator. As the wavelength λ varies, the two focal spots 410 and 410' move symmetrically about the optical axis 414 and the central fringe remains stationary. This results in a spatial phase of the fringe pattern 112 which does not depend on wavelength λ. This wavelength independence is important in a manufacturing environment where it is difficult to temperature stabilize the wavelength λ of the laser source 402. In one embodiment, laser diodes are used because they are relatively inexpensive and readily available. However, typical laser diodes have a temperature dependent operating wavelength λ. This temperature dependence can otherwise cause measurements to drift with temperature.

In another embodiment, the light source 402 is a broadband or white-light source. In that embodiment, each wavelength λ generates a fringe pattern and these component fringe patterns coincide due to their wavelength independence to produce a resulting broadband, or white-light fringe pattern. Motion 412 of the diffraction grating 404 shifts each wavelength component of the fringe pattern 112 by the same distance. This provides phase shifting of the white-light interference-fringe pattern. Skilled artisans will appreciate that one advantage of producing the fringe pattern 112 with a broadband light source is that it eliminates the speckle noise in the measurement that is present when using a laser source.

Figure 5:
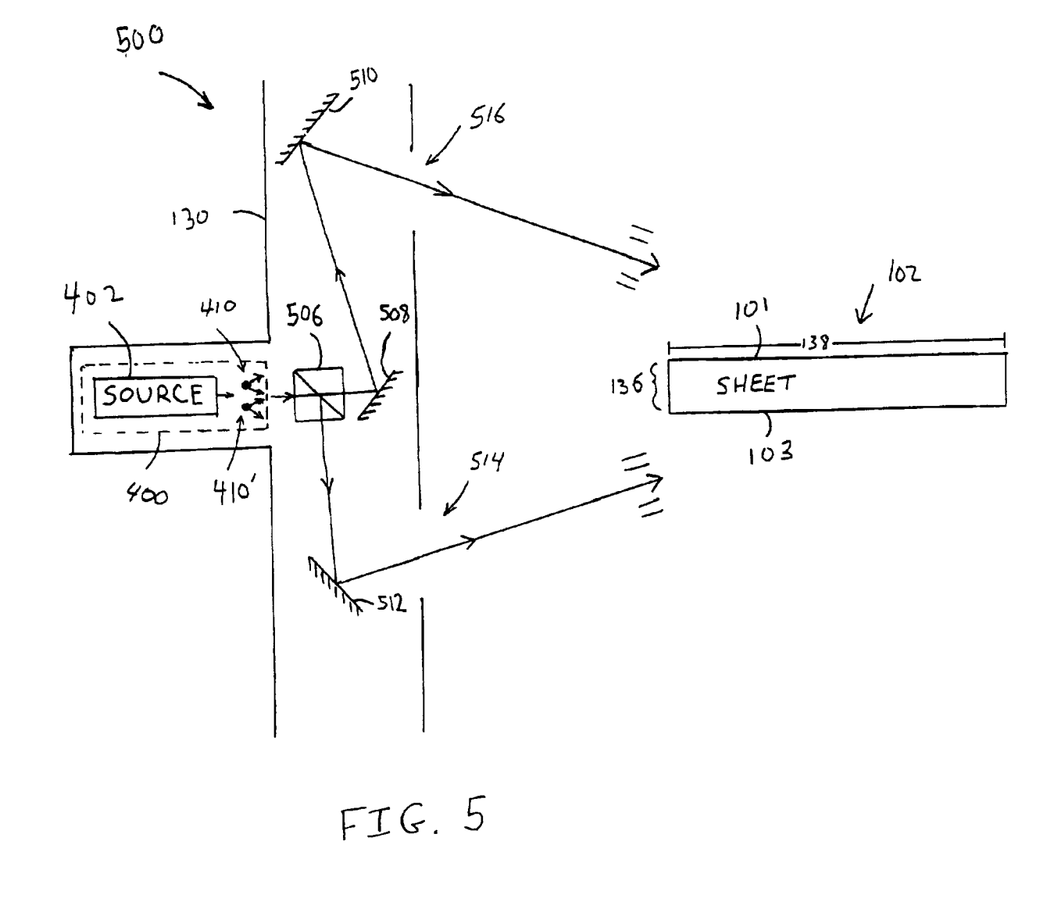
FIG. 5 is a block diagram of an apparatus for generating two fringe patterns according to one embodiment of the invention.

FIG. 5 illustrates a fringe projector 500 for projecting two fringe patterns according to one embodiment of the invention. The fringe projector 500 includes the fringe generator 400 of FIG. 4. The fringe projector 500 further includes a beamsplitter 506. The fringe projector 500 also includes mirrors 508, 510, and 512. In one embodiment, the components of the fringe projector 500 are mounted to a structure 130. In another embodiment, the structure 130 includes apertures 514 and 516 for allowing light from the mirrors 510 and 512 to reach the surfaces 101 and 103, respectively, of the sheet of material 102. In other embodiments, the location and orientation of the mirrors 508, 510, and 512 are variable to accommodate a wide range of thickness values 136.

In operation, the fringe projector 500 generates both a first 112 and a second 114 fringe pattern. Focal spots 410 and 410' direct light onto beamsplitter 506. Beamsplitter 506 splits the light from focal spots 410 and 410' onto the mirror 508 and the mirror 512. The mirror 508 directs light to mirror 510. The mirrors 510 and 512 direct light through apertures 516 and 514, respectively, and onto the surfaces 101 and 103 of the sheet of material 102. The focal spots 410 and 410' project interference patterns 112 and 114 onto the first surface 101 and the second surface 114 of the sheet of material 102. In another embodiment, the location and position of the mirrors 510 and 512 are variable so as to provide thickness measurements for a wide variety of materials.

In one embodiment, calibration of the thickness monitor 100 is achieved by measuring thickness standards. For example, gauge blocks can be used as thickness standards. In another embodiment, the gauge blocks can be used to map out any nonlinearities or systematic errors that exist in the thickness monitor 100. In one embodiment, these systemic errors are stored in a lookup table in the control electronics 120. The thickness monitor 100 consults the lookup table during operation to compensate for the systemic errors. This technique is equally applicable to surface-displacement sensing, whether sensing both surfaces 101, 103 or only one surface 101 of an object 102. In another embodiment, the flatness monitor 300 of FIG. 3 uses a lookup table to compensate for errors.

Having described and shown the preferred embodiments of the invention, it will now become apparent to one skilled in the art that other embodiments incorporating the concepts may be used and that many variations are possible which will still be within the scope and spirit of the invention. It is felt, therefore, that these embodiments should not be limited to disclosed embodiments but rather should be limited only by the spirit and scope of the invention.

What is claimed is:

1. An apparatus for monitoring thickness variations of an object having first and second opposing surfaces, the apparatus comprising:
   a first source positioned to project a first fringe pattern at a first location on the first surface;
   a second source positioned to project a second fringe pattern at a first location on the second surface;
   a first detector positioned to detect the first fringe pattern at the first location on the first surface, the first detector generating a first signal in response to the first fringe pattern at the first location;
   a second detector positioned to detect the second fringe pattern at the first location on the second surface, the second detector generating a second signal in response to the second fringe pattern at the first location;
   a processor adapted to calculate variations in the thickness of the object in response to the first and the second signals; and
   a control system locating the first and second fringe patterns to second locations on the first and second surfaces, respectively, the first and second detectors generating third and fourth signals, respectively in response to the first and second fringe patterns at the second locations, the processor adapted to calculate variations in the thickness of the object in response to the first, second, third and fourth signals.

2. The apparatus of claim 1 wherein the first and second sources are generated from a single source.

3. The apparatus of claim 1 wherein the first source comprises two subsources, wherein the subsources are coherent with respect to one another.

4. The apparatus of claim 1 wherein the first source is a broadband source.

5. The apparatus of claim 1 wherein the second source is a broadband source.

6. The apparatus of claim 1 wherein the first and second sources are coherent with respect to one another.

7. The apparatus of claim 1 wherein the processor calculates the variations in the thickness by detecting the displacement of a fringe in the first fringe pattern and the second fringe pattern.

8. The apparatus of claim 1 wherein the object is substantially stationary and wherein the control system moves the first detector and the second detector relative to the object.

9. The apparatus of claim 1 wherein a single detector replaces the first and second detectors.

10. A method for monitoring thickness variations of an object having first and second opposing surfaces, the method comprising the steps of:

illuminating the first surface with radiation from a first source to produce a first fringe pattern at a first location on the first surface;

illuminating the second surface with radiation from a second source to produce a second fringe pattern at a first location on the second surface;

detecting the first and second fringe patterns at the first locations on the first and second surfaces, respectively;

moving the first and second fringe patterns to second locations on the first and second surfaces, respectively;

detecting the first and second fringe patterns at the second locations on the first and second surfaces, respectively; and     calculating variations in the thickness of the object in response to a comparison between the first and second fringe patterns at the first locations, and the first and second fringe patterns at the second locations.

11. The method of claim 10 wherein the calculation of the variations in the thickness comprises counting a fringe from the first fringe pattern and the second fringe pattern at the first and the second locations.

12. The method of claim 10 wherein the step of moving the first and second fringe patterns comprises holding the object substantially stationary and moving the first detector and the second detector relative to the object.

13. The method of claim 10 wherein the step of calculating the variations in the thickness comprises subtracting the first and second fringe patterns at the first locations from the first and second fringe patterns at the second locations.

14. The method of claim 10, the method comprising the additional step of: counting a fringe from the first fringe pattern and the second fringe pattern at the first and the second locations.

15. The method of claim 10 wherein the step of moving the first and second fringe patterns comprises holding the object substantially stationary and moving the first detector, the second detector, the first source, and the second source together relative to the object.

16. The method of claim 10 wherein the step of moving said first and second fringe patterns comprises moving the object relative to the first detector, the second detector, the first source, and the second source.

17. An apparatus for monitoring the flatness of an object having a surface, the apparatus comprising:

a source positioned to project a fringe pattern at a first location on the surface;

a detector positioned to detect the fringe pattern at the first location on the surface; wherein the detector generates a first signal in response to the fringe pattern at the first location;

a processor adapted to monitor variations in the flatness of the object in response to the first signal; and     a control system for locating the fringe pattern at a second location on the surface, wherein the detector generates a second signal in response to the fringe pattern at the second location and the processor is adapted to monitor variations in the flatness of the object in response to the first and second signals.

18. A method for monitoring variations in the flatness of an object having a surface, the method including the steps of:

illuminating the surface with radiation from a source to produce a fringe pattern at a first location on the surface of the object;

detecting the fringe pattern at the first location on the surface of the object; monitoring the variations in the flatness of the object in response to the detected fringe pattern at the first location on the surface;

moving the fringe pattern to a second location on the surface,     detecting the fringe pattern at the second location on the surface, and     monitoring the variations in the flatness of the object in response to a comparison between the fringe pattern at the first location, and the fringe pattern at the second location.

19. The method of claim 18 comprising the additional steps of illuminating a surface of a known flat standard with radiation from the source to produce a fringe pattern at a first location on the surface of the known flat standard, detecting the fringe pattern at the first location on the surface of the known flat standard, and comparing the variations in the flatness of the known flat standard with the variations in the flatness of the object to generate compensated variations in the flatness of the object.

20. The method of claim 18 wherein the step of moving the fringe pattern includes holding the object substantially stationary and moving the detector relative to the object.

21. The method of claim 18 wherein the step of moving said first and second fringe patterns comprises holding the object substantially stationary and moving the first detector, the second detector, the first source, and the second source together relative to the object.

22. The method of claim 18 wherein the step of moving said first and second fringe patterns comprises moving the object relative to the first detector, the second detector, the first source, and the second source.

* * * * *

UNITED STATES PATENT AND TRADEMARK OFFICE
CERTIFICATE OF CORRECTION

| | | |
|---|---|---|
| PATENT NO. | : 6,937,350 B2 | |
| APPLICATION NO. | : 10/180679 | |
| DATED | : August 30, 2005 | |
| INVENTOR(S) | : Lyle Shirley | |

It is certified that error appears in the above-identified patent and that said Letters Patent is hereby corrected as shown below:

Delete the paragraph titled 'GOVERNMENT SUPPORT' encompassing column 1, line 13-16:

"This invention was made with government support under Federal Contract No. F19628-95-L-002, awarded by the United States Air Force. The Government may have certain rights in the invention."

and replace with:

--This invention was made with government support under Contract No. F19628-95-C-0002 awarded by the U.S. Air Force. The government has certain rights in this invention.--

Signed and Sealed this
Fourth Day of December, 2012

David J. Kappos
*Director of the United States Patent and Trademark Office*